United States Patent
Mild et al.

(10) Patent No.: US 6,938,052 B2
(45) Date of Patent: Aug. 30, 2005

(54) ACCESS TO SERVER RESOURCES FROM HETEROGENEOUS PLATFORMS

(75) Inventors: Wilhelm Mild, Boeblingen (DE); Ingolf Salm, Gaeufelden (DE)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 09/739,849

(22) Filed: Dec. 18, 2000

(65) Prior Publication Data

US 2001/0021932 A1 Sep. 13, 2001

(30) Foreign Application Priority Data

Dec. 23, 1999 (EP) ............................................. 99125774

(51) Int. Cl.[7] ........................... G06F 7/00; G06F 17/30; G06F 17/00
(52) U.S. Cl. ........................ 707/104.1; 707/103; 707/1
(58) Field of Search ......................... 707/104.1, 1, 103

(56) References Cited

U.S. PATENT DOCUMENTS

| | | | | |
|---|---|---|---|---|
| 5,379,419 A | * | 1/1995 | Heffernan et al. ............. | 707/4 |
| 5,522,066 A | | 5/1996 | Lu ................................. | 707/1 |
| 5,640,550 A | | 6/1997 | Coker ........................... | 707/4 |
| 5,689,698 A | * | 11/1997 | Jones et al. .................... | 707/4 |
| 5,764,973 A | | 6/1998 | Lunceford et al. ............. | 707/1 |
| 5,819,251 A | * | 10/1998 | Kremer et al. ................. | 707/1 |
| 5,819,263 A | * | 10/1998 | Bromley et al. ............... | 707/3 |
| 5,826,077 A | | 10/1998 | Balkeley et al. ............... | 707/4 |
| 5,909,570 A | | 6/1999 | Webber ......................... | 703/13 |
| 5,970,490 A | * | 10/1999 | Morgenstern ................. | 707/10 |
| 6,016,501 A | * | 1/2000 | Martin et al. ................ | 707/203 |
| 6,018,743 A | * | 1/2000 | Xu ........................... | 707/103 R |
| 6,023,684 A | * | 2/2000 | Pearson ....................... | 705/35 |
| 6,202,070 B1 | * | 3/2001 | Nguyen et al. .......... | 707/104.1 |
| 2001/0018684 A1 | | 8/2001 | Mild et al. | |

* cited by examiner

Primary Examiner—Frantz Coby
Assistant Examiner—Cindy Nguyen
(74) Attorney, Agent, or Firm—William A. Kinnaman, Jr., Esq.; Kevin P. Radigan, Esq.; Heslin Rothenberg Farley & Mesiti P.C.

(57) ABSTRACT

The present invention relates to method and system for accessing server resources from heterogeneous platforms which are distributed in a distributed application network. One aspect of the present invention is to generate a connecting mechanism, i.e. a connector between the relational data base and the non-relational data system which must be programmed as well, but which is—once programmed—independent of changes made to the application used on the client side during program maintenance. According to an advantageous aspect of the present invention this is achieved by programming so-called 'stored procedures' which access the non-relational data and which process them according to prior art relational data base technology in order to be accessed by JDBC, ODBC or CLI interface for e.g. from IBM DB2 relational database technology on the client side.

16 Claims, 4 Drawing Sheets

ACCESS TO SERVER RESOURCES FROM HETEROGENEOUS PLATFORMS

PRIOR FOREIGN APPLICATION

This application claims priority from European patent application number 99125774.2, filed Dec. 23, 1999, which is hereby incorporated herein by reference in its entirety.

TECHNICAL FIELD

The present invention relates to the area of computer technology, and in particular it relates to method and system for accessing server resources from heterogeneous platforms which are distributed in a distributed application network.

BACKGROUND ART

In a distributed application network with a plurality of data servers of different platforms a plurality of client applications must be enabled to access business data which are stored on said servers. When there are only relational data bases in the system such an access can be easily realized by prior art standard interfaces between client application and relational data base which is hosted on for example a centralized located data base server. By help of standard interfaces like JDBC/ODBC or CLI any relational database can be explored. Said access is implemented using e.g. the DRDA standard, i.e. distributed relational data base architecture for IBM DB2 relational data base architecture. Standard transfer protocols like APPC or TCP/IP are used for transferring the data across the network.

The access is complicated, however, when in the same distributed data base application network there are some data resources which must be accessed as well but which are not stored in a relational data base but, for example, stored in a hierarchical data base or in sequential files as it is the case for example in files which are accessed by VSAM (virtual storage access method) or for data which are stored in a hierarchical data base like DL/1. Such data types are further referred to herein as proprietary data types.

Such a system configuration is depicted in FIG. 1 in an exemplary form where a central data base server 10 having the operating system VSE/ESA hosts a relational DB/2 data base 12. When one of a plurality of client systems 13—a computer system with any operating system onto which is implemented some business application 14—wants to access the data stored in the relational data base 12 via the network it uses the standard interfaces JDBC, or ODBC, or CLI depending of the platform operating system in use.

The universal standard connecting interface to the relational data base is depicted with the bi-directional arrow 18. Any request for accessing the relational data can be satisfied easily. If, however the same client application wants to access data stored in a VSAM-file 20 or data which are stored in a hierarchical data base 22 the access must be realized by using proprietary vendor interfaces 24, and 26 respectively which serve as adapter programs in order to access the non-relational, proprietary data in either of the data storages 20, or 22, respectively.

The disadvantage is that such adapter programs must be programmed and maintained individually for each application product version and must be installed in a plurality of locations in the distributed application system. This additional service is expensive and prone to error.

SUMMARY OF THE INVENTION

It is thus an object of the present invention to facilitate access to said non-relational, proprietary data without the need of such vendor adapter programs.

These objects of the invention are achieved by the features stated in various claims. Further advantageous arrangements and embodiments of the invention are set forth in the respective claims.

The basic idea comprised of the present invention is to generate a connecting mechanism, i.e. a connector between the relational data base and the non-relational data system which must be programmed as well, but which is—once programmed—independent of the application version number used on the client side when the application program was changed due to program maintenance.

According to an advantageous aspect of the present invention this is achieved by programming so called 'stored procedures' which access the non-relational data and which process them according to prior art relational data base technology in order to be accessed by the DRDA standard interface for e.g. IBM DB2 relational database technology used by JDBC or ODBC or CLI on the client side.

Briefly, a stored procedure is a routine that is called from a client application logic but which runs on the associated database server in a distributed network environment. The most common reason to use a stored procedure is for database intensive processing that produces only small amounts of result data. This can save a large amount of communications across the network during the execution of the stored procedure. A stored procedure may be used also for a set of operations that are common to multiple applications. In this way, all the applications use the same logic to perform the operations.

Generally, in a database application environment, many situations are repetitive; for example, receiving a fixed set of data, performing the same multiple requests against a database, or returning a fixed set of data. In this context stored procedures permit one call to a remote database to execute a preprogrammed procedure. One call may represent several accesses to the database.

Processing a single SQL statement for a remote database requires sending two transmissions: one request and one receive transmission.

However, an application can contain many SQL statements. Without stored procedures, many transmissions are required for an application to complete its work.

When a database client uses a stored procedure, it requires only two transmissions, send request and get request, for the entire process, thereby reducing the number of network transmissions. To invoke a stored procedure, the requesting application must connect to the database containing the procedure before calling it.

Thus said principles of stored procedures can be advantageously exploited for the purposes of the present invention.

In this way both, a read access and a write access can be initiated by any client application situated at any remote location in the network. In this approach the inventional connecting mechanism—connector—exploits existing interfaces whereby an access method is provided which is platform independent in regard to the client application side and which does not require any additional software and the resulting additional and disadvantageous maintenance problems as described above.

The inventional approach works for any server platform, e.g. for UNIX platforms, WINDOWS NT platforms or any mainframe technology. Thus, the range of utilization of the inventional concepts is very wide.

The advantages of the present invention access method are thus summarized as follows:

No additional software is required on the requester side for communication access control, as standard interfaces can be used.

A software change is required in the stored procedures only, e.g., when the legacy system changes, as e.g., when the data structure of the legacy system changes.

Independent on legacy information relational information can easily be mixed with legacy information inside the processing of the stored procedure.

The legacy logic is hidden from the requester as any know how to get data read from said legacy system is encapsulated in the stored procedures. This saves system management work and helps to reduce staff with increased skill in legacy system structures.

An integrated solution in heterogeneous relational environments is provided as the concept of applying stored procedures for accessing non-relational data is platform independent.

The legacy system is hidden for the requestor, so it can easily be replaced by any other server with similar functionality.

A further advantage is that the client side security mechanism required for accessing relational data does not change and can be applied for accessing the non-relational data, too. This helps to organize the workflow.

BRIEF DESCRIPTION OF THE DRAWINGS

The present invention is illustrated by way of example and is not limited by the shape of the figures of the accompanying drawings in which.

BEST MODE FOR CARRYING OUT THE INVENTION

Figure 1:
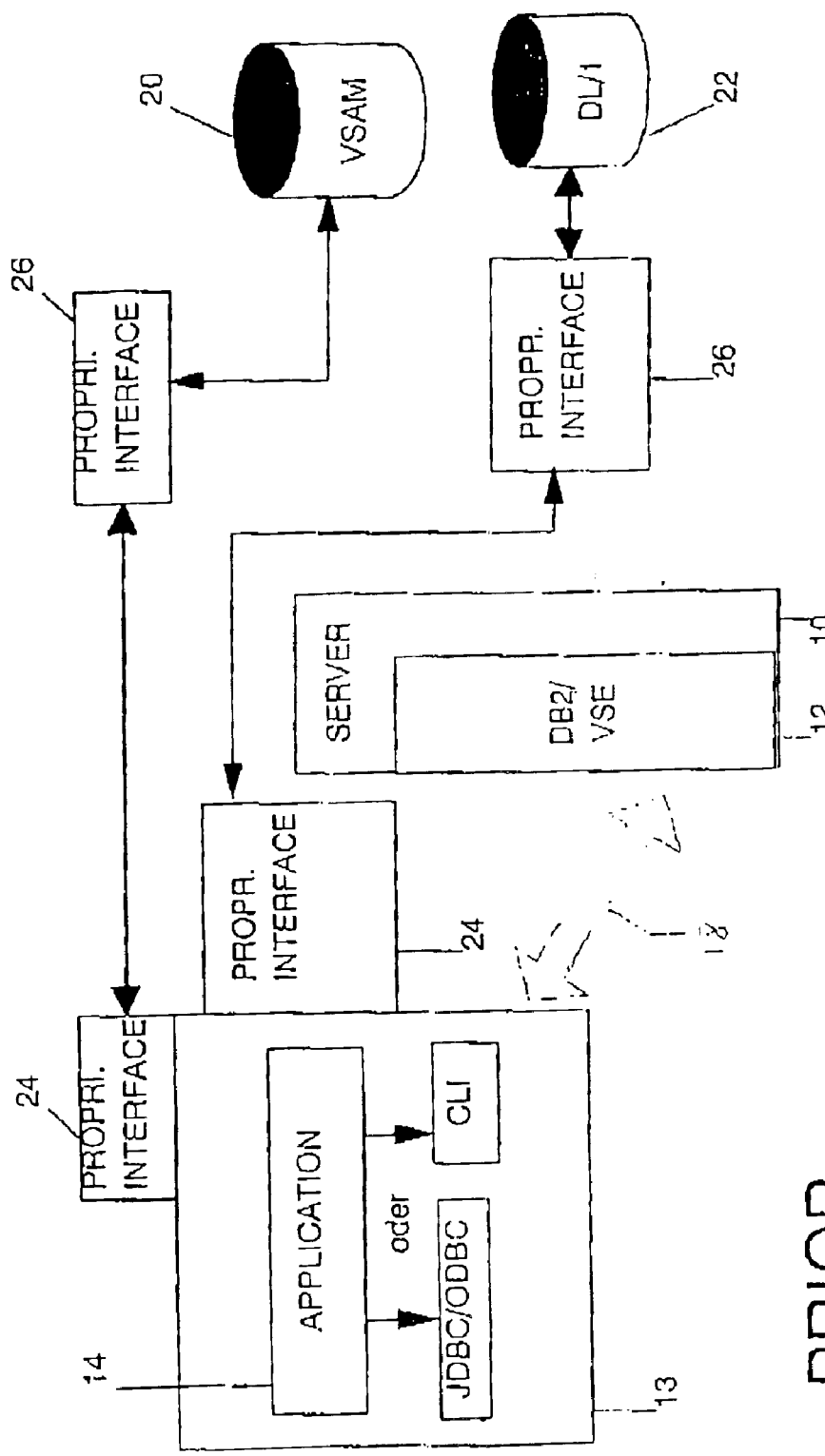
FIG. 1 shows a schematic representation of the system environment and the program components used in prior art in order to access non-relational data from a client application side.
Figure 2:
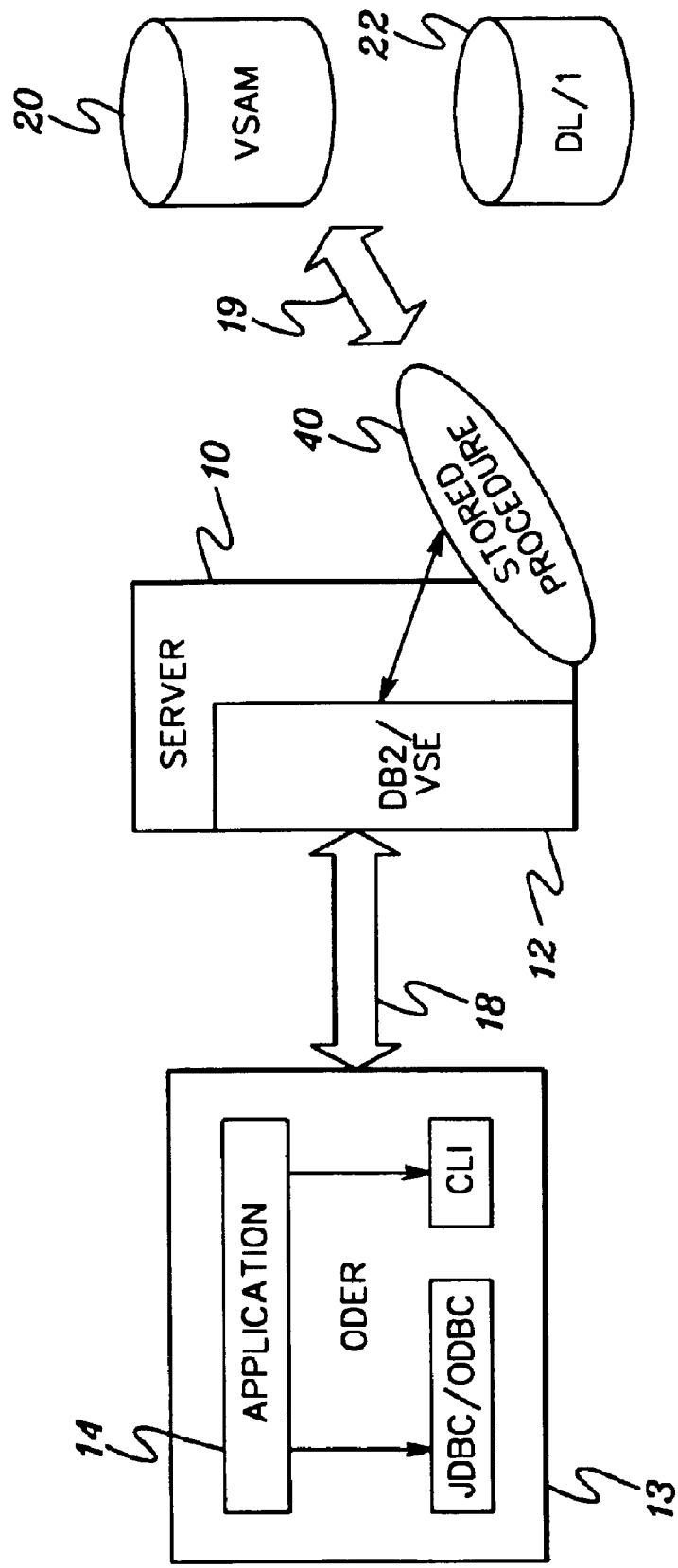
FIG. 2 shows the same environment and access problem with a solution according to the present invention.

With special reference now to FIG. 2 basically the same system structure is depicted as in FIG. 1. In FIG. 2, however, the proprietary interfaces 24 and 26 are not necessary anymore. The access to non-relational data stored in the database 20 is managed via the standard JDBC interface present anyhow in the system as it is required by the presence and use of the relational database 12 and via stored procedures which are implemented advantageously in the relational database server 10. Any access logic required for reading from said non-relational database or writing into it is programmed within said stored procedures. This is depicted with the bi-directional arrow 19. The details of this access is described next below.

Figure 3:
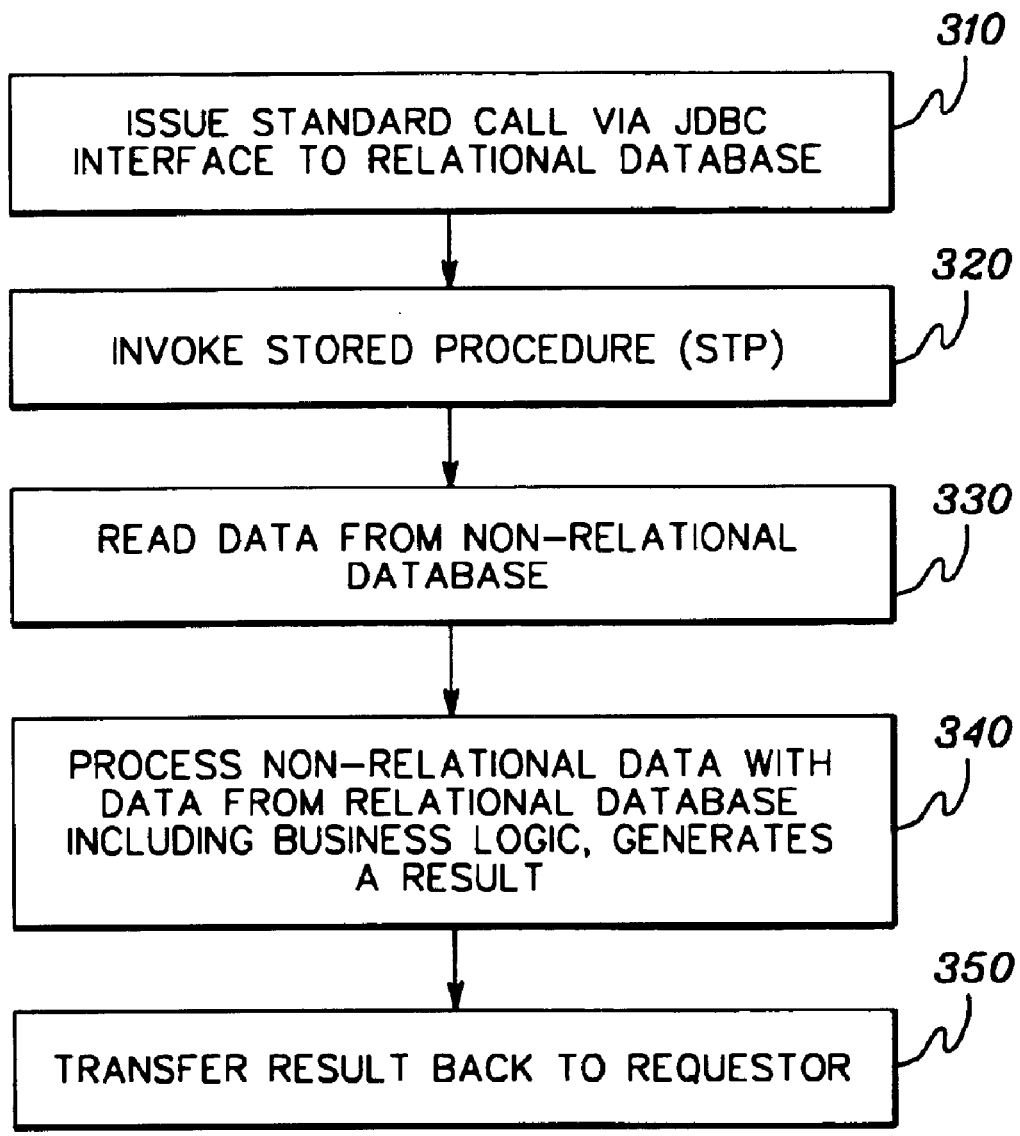
FIG. 3 shows the basic steps of the control flow during the inventional method.
Figure 4:
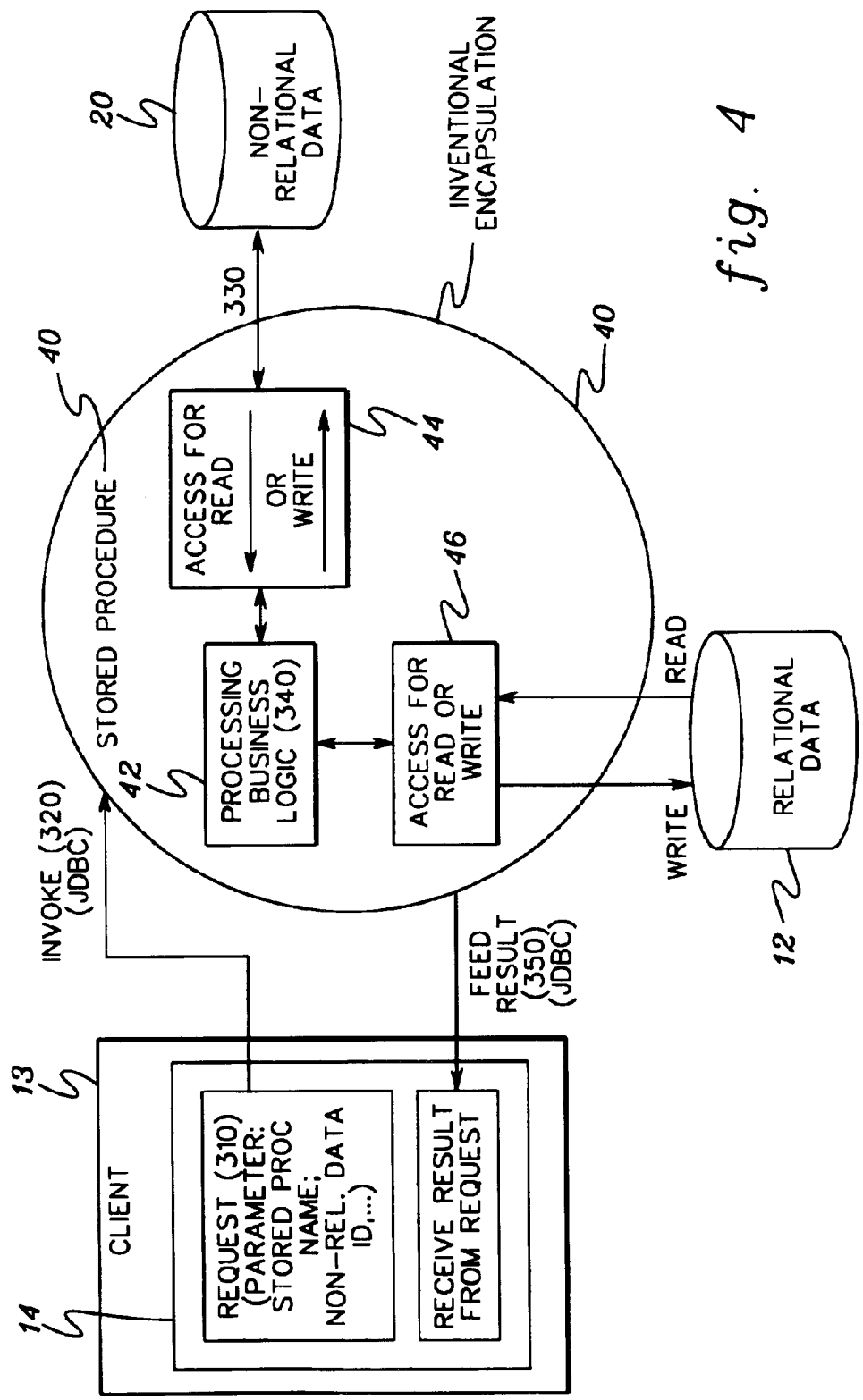
FIG. 4 is a schematic diagram showing the essential physical and logical elements participating in the inventional access method and illustrating the principle of encapsulation.

With reference now to FIG. 3 and FIG. 4—where appropriate—an example is given in which a client application 14 in a WINDOWS NT platform 13 wants to access non-relational data stored in a VSAM- file 20. The client application is connected to a VSE/ESA data base server 10 located centrally and hosting a DB/2 relational data base 12.

The client application, further referred to herein as 'requestor', too, issues in a first step 310 a request for accessing some specified data stored in the VSAM-file 20. The request comprises all relevant information in order to define the access to the relevant data. In particular, it comprises the data specification, the TCP/IP address of the requester, the name of the stored procedure to be invoked by the request, and the parameters to be sent and retrieved.

According to an inventional feature of the present invention this request can use the standard call interface JDBC or, alternatively ODBC or, alternatively CLI to address a procedure which is stored in the relational data base system 12. Thus, said stored procedure is invoked in a step 320.

Said stored procedure accesses now the non-relational data stored in the VSAM file 20 for reading some data therefrom, step 330.

Then, in a step 340, said stored procedure processes said non-relational data together with data stored in the relational data base 12 according to some business logic programmed in said stored procedure, as well. A respective read access to said relational data, as well as a write access to them is depicted in FIG. 4. Said business logic may comprise any processing which is required for getting some data for processing any result from it out of said processing which is desired for the workflow which is processed on the client system 13.

When the processing of the stored procedure has completed yielding said result it is transferred via the same standard interface JDBC to the client system 13, step 350, which receives it in order to continue the intended workflow on the client system 13.

As reveals from FIG. 4 any processing related to addressing the non-relational data structure as well as any proprietary knowledge on the non-relational data system 20 is encapsulated within the stored procedure. This principle of encapsulation is depicted with the frame 40 around said stored procedure activities.

Thus, according to the basic principle of the present invention the access to any legacy information including data, business logic, etc. is routed through the relational data base onto the remote system. The END-user at the client system 13 needs to know nothing about the system structure of the non-relational data base 20 for doing said job. Any know-how on said non-relational system is concentrated in the stored procedure. Thus, whenever an update of the client application program 14 is required no program logic needs to be added into said new version of the application program as the same invocation of the same stored procedure can be issued by the client application.

With reference to FIG. 4 this sequence of steps depicted in FIG. 3 is illustrated together with the structural system representation of FIG. 4. The same reference signs refer to the same elements as described before.

As should reveal from the drawing a basic aspect of the current invention, i.e., to encapsulate all relevant know how about the legacy system and the data structure of the non-relational database 20, or 22 is clearly visible by the frame 40 which comprises primarily the stored procedure which is thus associated as well with t reference sign 40 including in turn program logic 44 for accessing—read and/or write the non-relational data 20.

Advantageously it might comprise as well the program logic 46 for accessing the relational data—if necessary, and further the program logic 42 for performing some business logic with the data fetched from either of the data storage systems 20, and 12.

Further, it is obvious that the contents of the stored procedure 40 might be limited to the program means for reading-only from the non-relational database 20 and that a second stored procedure might be provided for writing into the non-relational database. Thus any program stuff related here to is able to be splitted up in several parts as it is usual in prior art programming.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A non-relational data access tool according to the present invention can be realized in a centralized fashion as an Add-In, i.e., as one or more stored procedures for a relational database system.

Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for accessing non-relational resources from client computer systems, the resources being connectable to a distributed application network having at least one relational data base server system connectable to a plurality of said client systems, the method comprising:

specifying access specifications related to non-relational data resources in procedure means associated with said at least one relational database server system; and accessing, by at least one client system of said plurality of client systems, said non-relational resources via an invocation of said procedure means, wherein said invocation uses a platform independent relational interface at one of the plurality of said client systems, and wherein said procedure means comprises an encapsulated proprietary interface at the at least one relational database server system which facilitates client system access to at least one of the non-relational resources and allows said access without using one or more individually maintained, proprietary interfaces residing at one or more client systems of the plurality of client systems.

2. The method according to claim 1 in which said procedure means are stored procedures implemented on said relational database system.

3. A database server system in which means are provided for performing the steps of the method according to claim 2.

4. Computer program comprising code portions adapted for performing the steps according to the method according to claim 2 when said program is loaded into a computer device.

5. Computer program product stored on a computer usable medium comprising computer readable program means for causing a computer to perform the method of claim 2.

6. Client system comprising program means adapted to perform the method according to claim 2.

7. The method according to claim 1 further comprising processing said non-relational data with relational data stored in said relational database according to business logic defined by said stored procedure.

8. A database server system in which means are provided for performing the steps of the method according to claim 7.

9. Computer program comprising code portions adapted for performing the steps according to the method according to claim 7 when said program is loaded into a computer device.

10. Computer program product stored on a computer usable medium comprising computer readable program means for causing a computer to perform the method of claim 7.

11. Client system comprising program means adapted to perform the method according to claim 7.

12. A database server system in which means are provided for performing the steps of the method according to claim 1.

13. Computer program comprising code portions adapted for performing the steps according to the method according to claim 1 when said program is loaded into a computer device.

14. Computer program product stored on a computer usable medium comprising computer readable program means for causing a computer to perform the method of claim 1.

15. Client system comprising program means adapted to perform the method according to claim 1.

16. A relational database server system residing in a distributed application network and connectable to a plurality of client computer systems, said relational database server system comprising stored procedure means for accessing non-relational data, wherein access specifications to said non-relational data are specified in said stored procedure means and said non-relational data is accessed by at least one client system of said plurality of client computer systems and by an invocation of the stored procedure means via a platform independent relational interface at one of the plurality of client computer systems, and wherein said procedure means comprises an encapsulated proprietary interface at the at least one relational database server system which facilitates client system access to at least one of the non-relational resources and allows said access without using one or more individually maintained proprietary interfaces residing at one or more client systems of the plurality of client systems.

* * * * *